(12) United States Patent
Bauman et al.

(10) Patent No.: US 8,689,953 B2
(45) Date of Patent: Apr. 8, 2014

(54) SEALED GAS SPRING COVER

(75) Inventors: Walter Douglas Bauman, Wixom, MI (US); Benjamin Seth Adams, Pittsburgh, PA (US); Mark M. Rose, Myrtle Beach, SC (US); Daniel J. Virga, Myrtle Beach, SC (US); Alton Dale Elvis, Aynor, SC (US); Hernan Dario Perin, Macomb, MI (US)

(73) Assignee: AVM Industries, Marion, SC (US)

( * ) Notice: Subject to any disclaimer, the term of this patent is extended or adjusted under 35 U.S.C. 154(b) by 2113 days.

(21) Appl. No.: 11/386,280

(22) Filed: Mar. 22, 2006

(65) Prior Publication Data

US 2007/0251779 A1    Nov. 1, 2007

(51) Int. Cl.
*F16F 9/36* (2006.01)
*F16F 5/00* (2006.01)

(52) U.S. Cl.
USPC ............... 188/322.16; 188/322.12; 267/64.27

(58) Field of Classification Search
USPC .......... 188/322.12, 322.16; 267/64.11, 64.19, 267/64.27
See application file for complete search history.

(56) References Cited

U.S. PATENT DOCUMENTS

| 2,149,040 | A | * | 2/1939 | Binder et al. | 188/298 |
| 2,842,230 | A | * | 7/1958 | MacPherson | 188/322.16 |
| 4,154,434 | A | * | 5/1979 | Wallis | 264/119 |
| 5,133,575 | A | * | 7/1992 | Zantinge et al. | 280/6.159 |
| 5,954,168 | A | * | 9/1999 | Nakatani et al. | 188/322.12 |
| 6,224,066 | B1 | * | 5/2001 | Oetiker | 277/634 |
| 6,883,651 | B2 | * | 4/2005 | Fukaya | 188/322.12 |
| 6,905,006 | B2 | * | 6/2005 | Handke et al. | 188/322.12 |
| 2007/0181392 | A1 | * | 8/2007 | Pawloski et al. | 188/322.12 |

FOREIGN PATENT DOCUMENTS

EP     0545765 A1 *  8/1993

\* cited by examiner

*Primary Examiner* — Melody Burch
(74) *Attorney, Agent, or Firm* — Carlson, Gaskey & Olds P.C.

(57) ABSTRACT

A gas spring assembly is used to control movement of a vehicle body panel relative to a vehicle body member. The gas spring assembly includes a rod and piston that are received within a tube or cylinder. A first rod end is coupled to the piston to move the piston back and forth within the cylinder. A second rod end is mounted to one of the vehicle body panel or the vehicle body member. The cylinder is mounted to the other of the vehicle body panel or the vehicle body member. The gas spring assembly includes a resilient cover that covers the rod and cylinder and extends from the second rod end to a distal cylinder end. The resilient cover extends and retracts with rod movement and is sealed at each end of the resilient cover to provide a completely sealed gas spring assembly.

10 Claims, 2 Drawing Sheets

SEALED GAS SPRING COVER

TECHNICAL FIELD

The subject invention relates to a gas spring assembly that includes a cover for an extendible rod that is sealed at each end.

BACKGROUND OF THE INVENTION

Gas spring assemblies are used to control movement of one component relative to another component. In one example, a gas spring assembly is used to control movement of a vehicle body panel, such as a liftgate or trunk lid, relative to a vehicle body member. The gas spring assembly is moveable between a fully extended position and a fully compressed position.

The gas spring includes a rod and piston assembly that is received within a cylinder. One rod end is coupled to the piston assembly to move the piston assembly back and forth within the cylinder. An opposite rod end is mounted to one of the vehicle body panel or the vehicle body member. The cylinder is mounted to the other of the vehicle body panel or the vehicle body member. When the gas spring is extended, at least a portion of the rod is exposed to an external environment. This exposes the rod to debris, dust, etc. from the external environment, which can adversely affect the sliding capability of the rod. Further, this dust and debris could enter the cylinder and adversely affect operation of the piston assembly.

Thus, there is a need for a gas spring assembly that provides protection for the rod and a sealed environment for the gas spring assembly.

SUMMARY OF THE INVENTION

A gas spring assembly is used to control movement of a vehicle panel relative to a vehicle body member. The gas spring assembly includes a tube that receives a piston assembly. A rod is connected to the piston assembly such that the rod and piston assembly move together within the tube between a fully extended position and a fully compressed position. The gas spring assembly includes a resilient cover that encloses the rod and provides sealed connections to the gas spring assembly at each end of the cover. The cover protects the rod and provides a completely sealed gas spring assembly. These and other features of the present invention can be best understood from the following specification and drawings, the following of which is a brief description.

DETAILED DESCRIPTION OF THE PREFERRED EMBODIMENT

Figure 1:
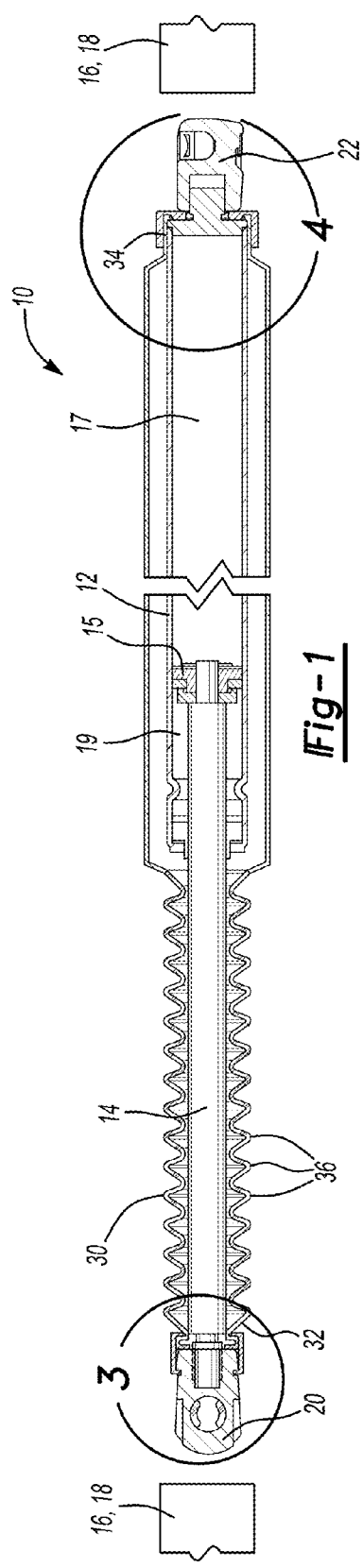
FIG. 1 shows a cross-sectional view of a gas spring assembly and a cover incorporating the subject invention.

FIG. 1 shows a gas spring assembly 10 including a tube 12 and a rod 14 that extends outwardly from the tube 12, and which is movable between a fully extended position and a fully compressed position. The rod 14 is connected to a piston assembly 15 that is received within the tube 12. The piston assembly 15 separates the tube 12 into a compression chamber 17 and an extension chamber 19 and is moved axially by the rod 14 to control gas flow between the compression 17 and extension 19 chambers as the rod 14 moves between the fully extended and fully compressed positions as known.

The gas spring assembly 10 is used to control movement between a fixed member 16 and a movable member 18 that moves relative to the fixed member 16. A first connector 20 is attached to the rod 14 and a second connector 22 is attached to the tube 12. One of the first 20 and second 22 connectors is connected to one of the fixed member 16 and movable member 18 with a ball stud (not shown). The other of the first 20 and second 22 connectors is connected to the other of the fixed member 16 and the movable member 18 with another ball stud. In one example, the fixed member 16 comprises a vehicle body member and the movable member 18 comprises a vehicle body panel such as a tailgate, hatchback, liftgate, trunk lid, hood, etc.

Figure 2:
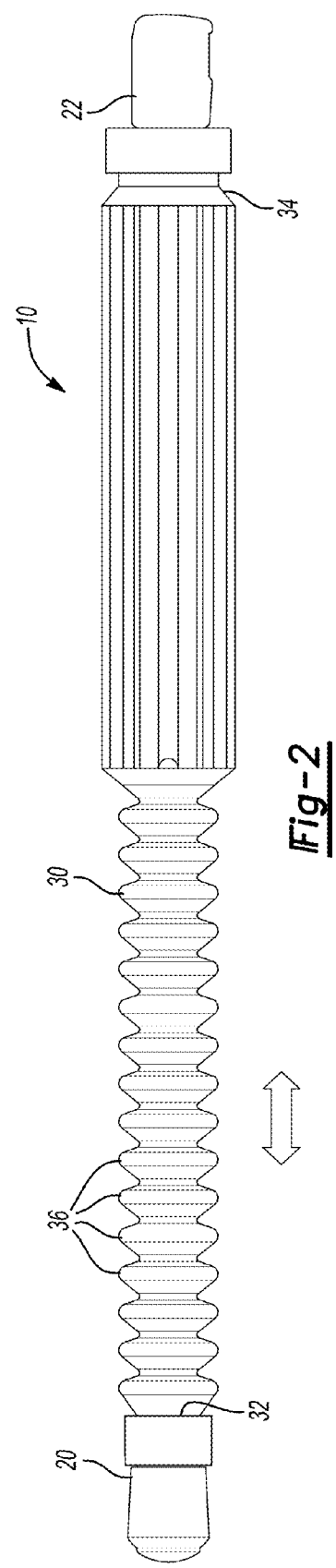
FIG. 2 shows side view of the gas spring assembly and cover of FIG. 1.

During movement of the rod 14, the rod 14 can be exposed to debris, dirt, dust, from an external environment. A cover 30 is attached to the gas spring assembly 10 to protect the rod 14. The cover 30 surrounds both the rod 14 and the tube 12 as shown in FIG. 2. The cover 30 is preferably made from a resilient material that can axially extend and contract with the rod 14 as the rod 14 moves between the fully extended and fully compressed positions. A preferred material is a thermoplastic elastomer (TPE) material, however, other resilient materials could also be used.

The cover 30 includes a first end 32 that is sealed against the rod 14 at a first sealed interface and a second end 34 that is sealed against the tube 12 at a second sealed interface. The cover 30 includes a plurality of accordion-like convolutions 36 that allow the cover 30 to easily move with the rod 14. Thus, the cover 30 not only covers the rod 14 and tube 12, but additionally provides a completely sealed environment for the gas spring assembly 10.

Figure 3:
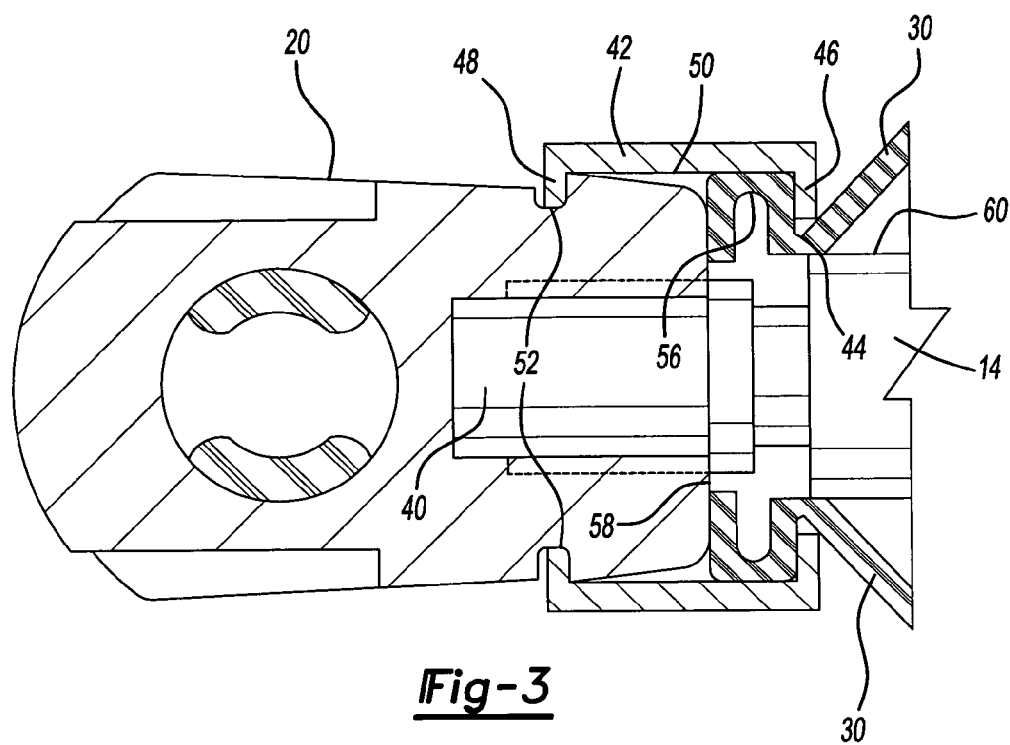
FIG. 3 shows an enlarged cross-sectional view of a sealed attachment interface between the cover and a rod.

The first sealed interface is shown in greater detail in FIG. 3. The rod 14 includes a rod end 40 that is attached to the first connector 20. Any type of attachment method can be used to attach the rod 14 to the first connector 20. A rod cap 42 is used to attach the cover 30 to the first connector 20. The rod cap 42 is preferably pre-assembled onto the cover 30 prior to sliding the gas spring assembly 10 into the cover 30. This will be discussed in greater detail below.

The rod cap 42 is preferably held in place on the cover 30 at a detent or groove 44. The rod cap 42 includes a first transversely extending lip portion 46 that is received within the groove 44. The rod cap 42 also includes a second transversely extending lip portion 48 positioned at a rod cap end opposite from the first transversely extending lip portion 46. The second transversely extending lip portion 48 engages a groove 52 formed on an outer surface of the first connector 20. The rod cap 42 clamps a portion 56 of the cover 30 between the first transversely extending lip portion 46 and an end face 58 of the first connector 20 to provide the first sealed interface. The cover 30 is tightly sealed against an outer surface 60 of the rod 14, an inner surface 50 of the rod cap 42, and the end face 58 of the first connector 20.

Figure 4:
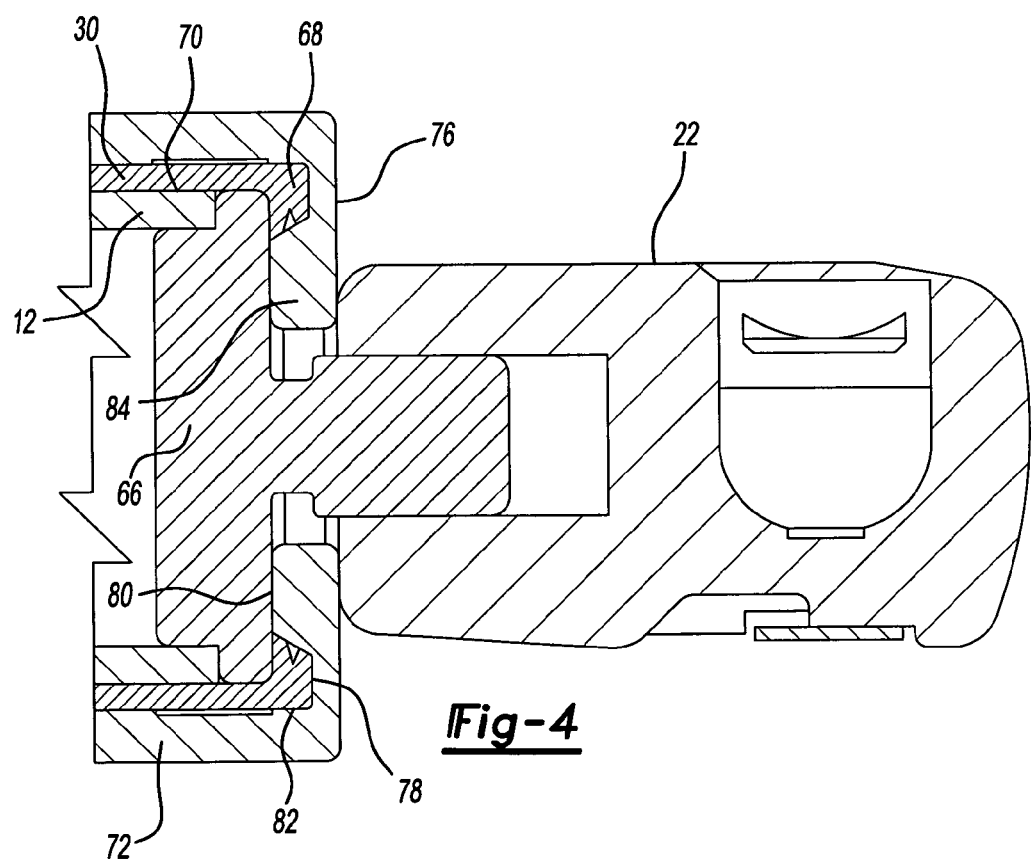
FIG. 4 shows an enlarged cross-sectional view of a sealed attachment interface between the cover and a tube.

The second sealed interface is shown in greater detail in FIG. 4. The tube 12 receives an end cap 66 that encloses an open end of the tube 12. The cover 30 includes an end portion 68 that engages an outer surface 70 of the tube 12 and an outer surface of the end cap 66. An end cap cover 72 is installed on the gas spring assembly 10 to attach the cover 30 to the tube 12 and end cap 66. The second connector 22 is attached to the end cap 66. Any type of attachment method could be used to attach the end cap 66 to the second connector 22.

When the second connector 22 is attached to the end cap 66 the second connector 22 abuts against an end face 76 of the end cap cover 72. The end portion 68 of the cover 30 is compressed between an inner end surface 78 of the end cap cover 72 and a shoulder surface 80 on the end cap 66. The end portion 68 of the cover 30 is also compressed between an inner circumferential surface 82 of the end cap cover 72, the tube 12, and end cap 66 to provide the second sealed interface. The end cap cover 72 also includes a raised abutment portion 84 that contacts the shoulder surface 80 of the end cap 66.

The cover 30 is preferably assembled to the gas spring assembly 10 in the following manner. The rod cap 42 is pre-assembled onto the cover 30 as described above. The gas spring assembly 10 is then slid into the cover 30. The cover 30 is then pushed back to expose the rod 14. The rod 14 is held against rotation by a fixture or clamping device. The first connector 20 is then connected to the rod 14. By pushing back the cover 30, the clamping can occur on the rod 14 without damaging the cover 30. After the first connector 20 is attached, the cover 30 is then pulled toward the first connector 20 to attach the rod cap 42 to the first connector 20. This provides the first sealed interface.

Either before or after the first connector 20 is attached to the rod 14, the tube 12 is held against rotation by a fixture or clamping device. The clamping device grabs against the cover 30 but due to a larger diameter of the tube 12 as compared to the rod 14, there is minimal risk of damaging the cover 30. The clamping device holds the tube 12, and the second connector 22 is attached to the end cap 66. The second connector 22 abuts against the end cap cover 72 as described above. This provides the second sealed interface.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A gas spring assembly comprising:
a tube;
a rod axially moveable relative to said tube between a fully extended position and a fully compressed position;
a resilient cover surrounding said tube and said rod, said resilient cover having a first sealed interface with said rod and a second sealed interface with said tube;
a first connector attached to said rod and a second connector attached to said tube wherein one of said first and said second connectors is adapted for connection to one of a fixed member and a movable member that moves relative to the fixed member and the other of said first and said second connectors is adapted for connection to the other of the fixed member and the movable member; and
a rod cap that secures a first end portion of said resilient cover adjacent said first connector, wherein said resilient cover establishes a groove for receiving a portion of said rod cap and an opposing second end portion of said resilient cover is secured adjacent said second connector, wherein said rod cap clamps said first end portion of said resilient cover axially against said first connector to provide said first sealed interface.

2. The gas spring assembly according to claim 1 wherein said resilient cover extends and retracts with said rod as said rod moves between said fully extended and said fully compressed positions.

3. The gas spring assembly according to claim 1 including an end cap attached to said tube and an end cap cover that secures a second end of said resilient cover to said end cap wherein said rod cap clamps said first end of said resilient cover against said first connector to provide said first sealed interface and said end cap cover clamps said second end of said resilient cover against said tube and said end cap to provide said second sealed interface.

4. A gas spring assembly comprising:
a tube;
a rod axially moveable relative to said tube between a fully extended position and a fully compressed position;
a resilient cover surrounding said tube and said rod, said resilient cover having a first sealed interface with said rod and a second sealed interface with said tube;
a first connector attached to said rod and a second connector attached to said tube wherein one of said first and said second connectors is adapted for connection to one of a fixed member and a movable member that moves relative to the fixed member and the other of said first and said second connectors is adapted for connection to the other of the fixed member and the movable member;
a rod cap that secures a first end portion of said resilient cover adjacent said first connector, wherein said resilient cover establishes a groove for receiving a portion of said rod cap and an opposing second end portion of said resilient cover is secured adjacent said second connector; and
an end cap enclosing an open end of said tube and an end cap cover that secures said second end portion of said resilient cover to said end cap, wherein said end cap cover clamps said second end portion of said resilient cover axially against said tube, said end cap, or both to provide said second sealed interface.

5. A gas spring assembly comprising:
a tube;
a rod axially moveable relative to said tube between a fully extended position and a fully compressed position;
a resilient cover surrounding said tube and said rod, said resilient cover having a first sealed interface with said rod and a second sealed interface with said tube;
a first connector attached to said rod and a second connector attached to said tube wherein one of said first and said second connectors is adapted for connection to one of a fixed member and a movable member that moves relative to the fixed member and the other of said first and said second connectors is adapted for connection to the other of the fixed member and the movable member;
a rod cap that engages a first end portion of said resilient cover and said first connector to secure said resilient cover to said first connector;
an end cap attached to said tube; and
an end cap cover that secures an opposing second end portion of said resilient cover to said end cap, wherein said end cap cover clamps said second end portion of said resilient cover against said tube and said end cap to provide said second sealed interface, wherein said second connector abuts against an outer end face of said end cap cover.

6. A vehicle component assembly comprising:
a vehicle frame member;
a vehicle body member movable relative to said vehicle frame member; and
a gas spring assembly including a tube having an open first end, a rod axially moveable relative to said tube within said tube between a fully extended position and a fully compressed position, and a resilient cover surrounding said tube and said rod, said resilient cover having a rod cap for clamping said resilient cover to provide a first sealed interface with said rod and an end cap to provide a second sealed interface with said tube, said second sealed interface adjacent a second end of said tube that is opposite said open first end, wherein said tube is sealed within said resilient cover.

7. The vehicle component assembly according to claim 6 including a first connector attached to said rod and a second connector attached to said tube wherein one of said first and said second connectors is connected to one of said vehicle frame member and said vehicle body member and the other of said first and said second connectors is connected to the other of said vehicle frame member and said vehicle body member.

8. The vehicle component assembly according to claim 7 wherein the end cap is attached to said tube and an end cap cover secures a second end of said resilient cover to said end cap wherein said rod cap clamps a first end of said resilient cover against said first connector to provide said first sealed interface and said end cap cover clamps said second end of said resilient cover against said tube and said end cap to provide said second sealed interface.

9. A gas spring assembly comprising:
   a tube;
   a rod axially moveable relative to said tube between a fully extended position and a fully compressed position;
   a resilient cover surrounding said tube and said rod said resilient cover having a first sealed interface with said rod and a second sealed interface with said tube;
   a first connector attached to said rod and a second connector attached to said tube wherein one of said first and said second connectors is adapted for connection to one of a fixed member and a movable member that moves relative to the fixed member and the other of said first and said second connectors is adapted for connection to the other of the fixed member and the movable member; and
   a rod cap that secures a end portion of said resilient cover adjacent said first connector, wherein said resilient cover establishes a groove for receiving a portion of said rod cap and an opposing second end portion of said resilient cover is secured adjacent said second connector, wherein a first end of said tube receives said rod and said resilient cover extends past said first end of said tube to an opposing, second end of said tube.

10. A gas spring assembly comprising:
    a tube;
    a rod axially moveable relative to said tube between a fully extended position and a fully compressed position;
    a resilient cover surrounding said tube and said rod, said resilient cover having a first sealed interface with said rod and a second sealed interface with said tube;
    a first connector attached to said rod and a second connector attached to said tube wherein one of said first and said second connectors is adapted for connection to one of a fixed member and a movable member that moves relative to the fixed member and the other of said first an said second connectors is adapted for connection to the other of the fixed member and the movable member; and
    a rod cap that secures a first end portion of said resilient cover adjacent said first connector, wherein said resilient cover establishes a groove for receiving a portion of said rod cap and an opposing second end portion of said resilient cover is secured adjacent said second connector, wherein said tube is completely received within said resilient cover.

* * * * *